Oct. 31, 1961 B. A. CALHOUN ET AL 3,006,856

METHOD OF MAKING YTTRIUM-ALUMINUM-IRON GARNETS

Filed Dec. 31, 1959 2 Sheets-Sheet 1

INVENTORS
BERTRAM A. CALHOUN
WILBERT L. SHEVEL JR.

BY Alvin J. Riddles
ATTORNEY

Oct. 31, 1961 B. A. CALHOUN ET AL 3,006,856

METHOD OF MAKING YTTRIUM-ALUMINUM-IRON GARNETS

Filed Dec. 31, 1959 2 Sheets-Sheet 2

United States Patent Office 3,006,856 Patented Oct. 31, 1961

3,006,856
METHOD OF MAKING YTTRIUM-ALUMINUM-IRON GARNETS

Bertram A. Calhoun and Wilbert L. Shevel, Jr., Poughkeepsie, N.Y., assignors to International Business Machines Corporation, New York, N.Y., a corporation of New York Filed Dec. 31, 1959, Ser. No. 863,320
8 Claims. (Cl. 252—62.5)

This invention relates to low magnetic moment garnets and more particularly to a method of preparing such garnets for application as high speed switching elements in computer circuitry.

Present day schemes for high-speed switching of magnetic elements are limited by overheating of the individual elements. For example, the use of the bistable, square hysteresis loop ferrite materials, as memory storage elements in computers is severely limited by the excessive heating of the elements during the switching operation. These elements thereupon require elaborate cooling procedures and/or operation at low repetition rates in order to overcome the overheating effect. The development of a suitable low moment magnetic material would permit operation at repetition frequencies limited only by the switching time of the material.

There are two distinct advantages to the use of a low moment material for switching operations, such as memory storage and pulse transfer.

First, as mentioned above, there is a decrease in the power dissipation during the switching operation. The power dissipated in an element during switching is proportional to $(\Delta\Phi)(NI)(f)$, where $\Delta\Phi$ is the amount of flux reversed, NI is the driving current, and $f$ is the number of times per second that the element is switched.

Secondly, low moment materials induce a lower back voltage in the drive windings.

At present a serious objection to the use of low moment materials at moderate or low speeds is the decreased output voltage which these materials provide. At high speed operation, however, this limitation no longer is present since the output voltage increases proportionately with the switching speed.

It is therefore of considerable interest to provide low magnetic moment garnet materials, suitable for operation in computer circuitry which have low switching constants and are capable therefore of operating at high switching speeds with high output voltages.

A number of ferromagnetic garnets with low magnetic moments and methods of preparing the same have been reported in the literature. In general these materials have a low remanence, high coercive forces and relatively slow switching speeds. Low moment ferrites on the other hand, exhibit a high remanence and low coercive forces but have exceedingly slow switching speeds and thus give an intolerably low output voltage for computer use.

According to the present invention a method of preparing high speed, low magnetic moment garnets has been provided which method produces products which are particularly suitable for use as switching elements in computer circuitry. In particular these elements exhibit a low power dissipation during switching operation, a decreased back voltage induction in the drive lines, a high output voltage, fast switching speeds, a high remanence and low coercive forces.

An object of the present invention is to provide a method of preparing low magnetic moment garnets which are suitable for high speed switching operation in computer circuitry.

A further object is to provide memory garnets having low moments and which exhibit a high output voltage during the switching operation.

Still another object of the instant invention is to provide methods of preparing storage garnet elements having a low power dissipation, a low moment, a relatively high remanence, a high switching speed, a high output voltage and relatively low coercive forces.

The foregoing and other objects, features and advantages of the invention will be apparent from the following more particular description of preferred embodiments of the invention, as illustrated in the accompanying drawings.

According to the present invention low magnetic moment ferromagnetic garnets suitable for operation as switching elements in computer circuitry have been provided. Specifically the method of the present invention involves sintering the garnet constituents at elevated temperatures within a prescribed temperature range in an oxygen oxidizing atmosphere and quenching the sintered product from the sintering temperature to room temperature within a very short time interval. Garnets prepared under these preparative conditions have been shown to exhibit the unique combination of magnetic and pulse characteristics required for operation of the bistable memory storage elements.

*Examples*

Garnets of composition $Y_3AlFe_4O_{12}$ were prepared by mixing 1.0 gram of $Al_2O_3$ and 6.3 grams of $Fe_2O_3$, calcining the oxide powders at approximately 1000° in air for one hour, then mixing the powders with 6.7 grams of $Y_2O_3$ and further calcining the mixture at 1300° C. in air for an additional one hour. The calcined powders were pressed into cores of 30 mils inside diameter and 50 mils outside diameter and 12 mils thickness. The core bodies thus prepared were fired in an oxygen oxidizing atmosphere, such as air or $O_2$, at 1440–1470° C. for a time sufficient to form the garnet structure, 8 hours being an ample period of time. After sintering, the core bodies were quenched to room temperature on a metal plate in air during about two minutes. The garnets thus prepared exhibited a flux density at saturation, $B_s$, of about 190 gausses and a retained flux density, $B_r$, of about 130 gausses. The switching threshold $H_o$ was 1.2 oersteds and the output voltage 30 millivolts.

Figure 1:
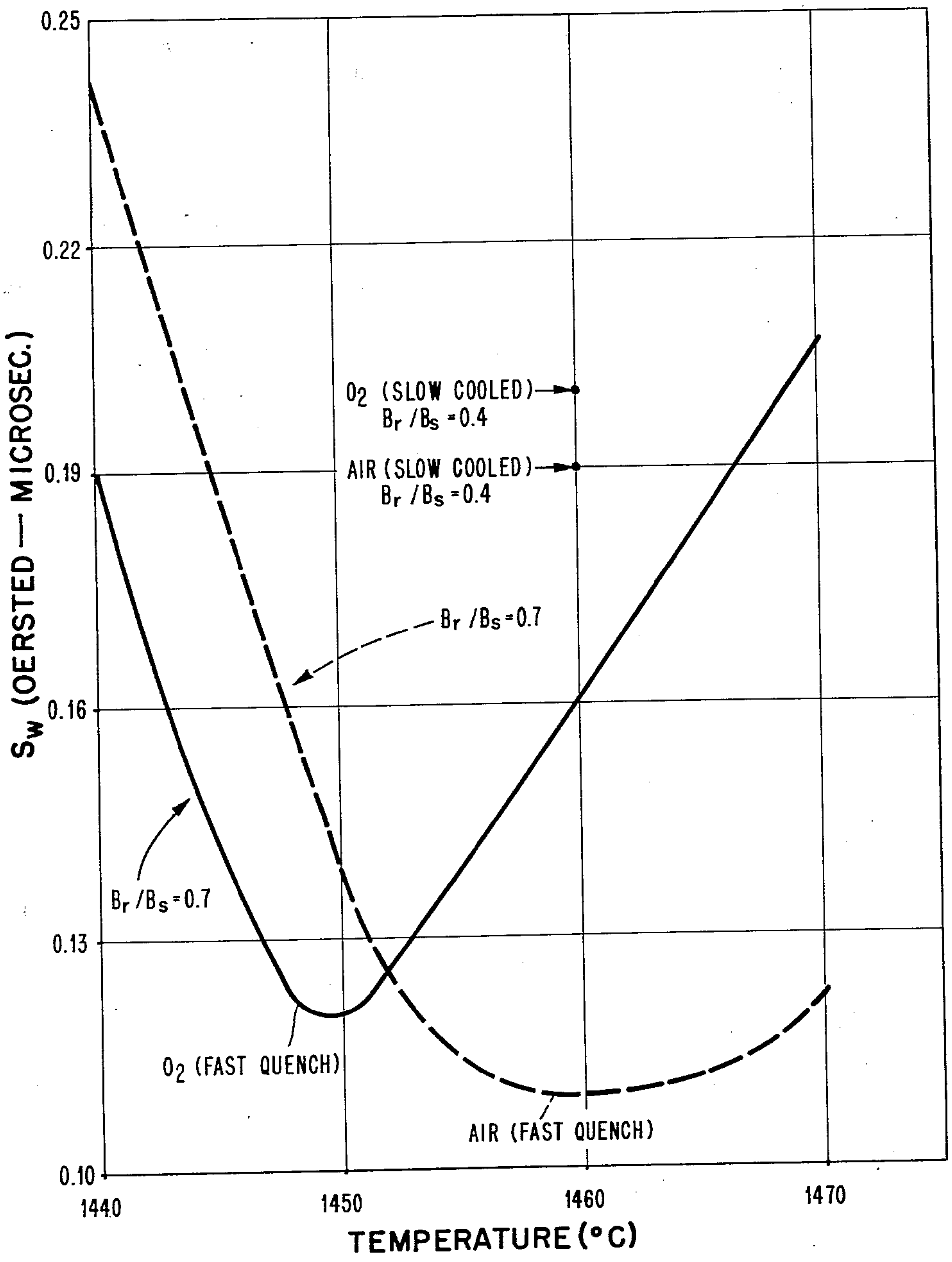
FIGURE 1 is a graphic representation in which is plotted the switching coefficient, $S_w$, versus sintering temperature for a low moment garnet material prepared according to the practice of the present invention.

FIGURE 1 shows the effect of the sintering temperature and the cooling rate on the switching constants of garnets of the composition $Y_3AlFe_4O_{12}$. Core bodies which were sintered within the temperature range 1440–1470° C. in an oxygen oxidizing atmosphere and rapidly quenched are shown to possess switching constants, $S_w$, which correlate to operational switching times of the order of 4 to 5 times faster than similar compositions prepared by sintering the core body at temperatures below this range. Sintering temperatures above this range are not useable since the garnet begins to decompose about 1470° C.

FIGURE 1 also shows the effect of slow cooling the same core body from the sintering temperature to room temperature in the sintering atmosphere over a period of about 1 hour as contrasted to rapid quenching. Slow cooling increases the switching constant by a factor of 2.

The high speed, $S_w$=about 0.20, low moment, $B_s$=about 200 garnets of the present invention provide useable output signals of 30 millivolts or more. Amplification of signals below 30 millivolts is not feasible with present day equipment. In addition, the slow cooled products are totally unsuitable as switching elements in computers since their remanence is too low, $B_r/B_s=0.4$, as compared to fast quenched products, $B_r/B_s=0.7$.

Figure 2:
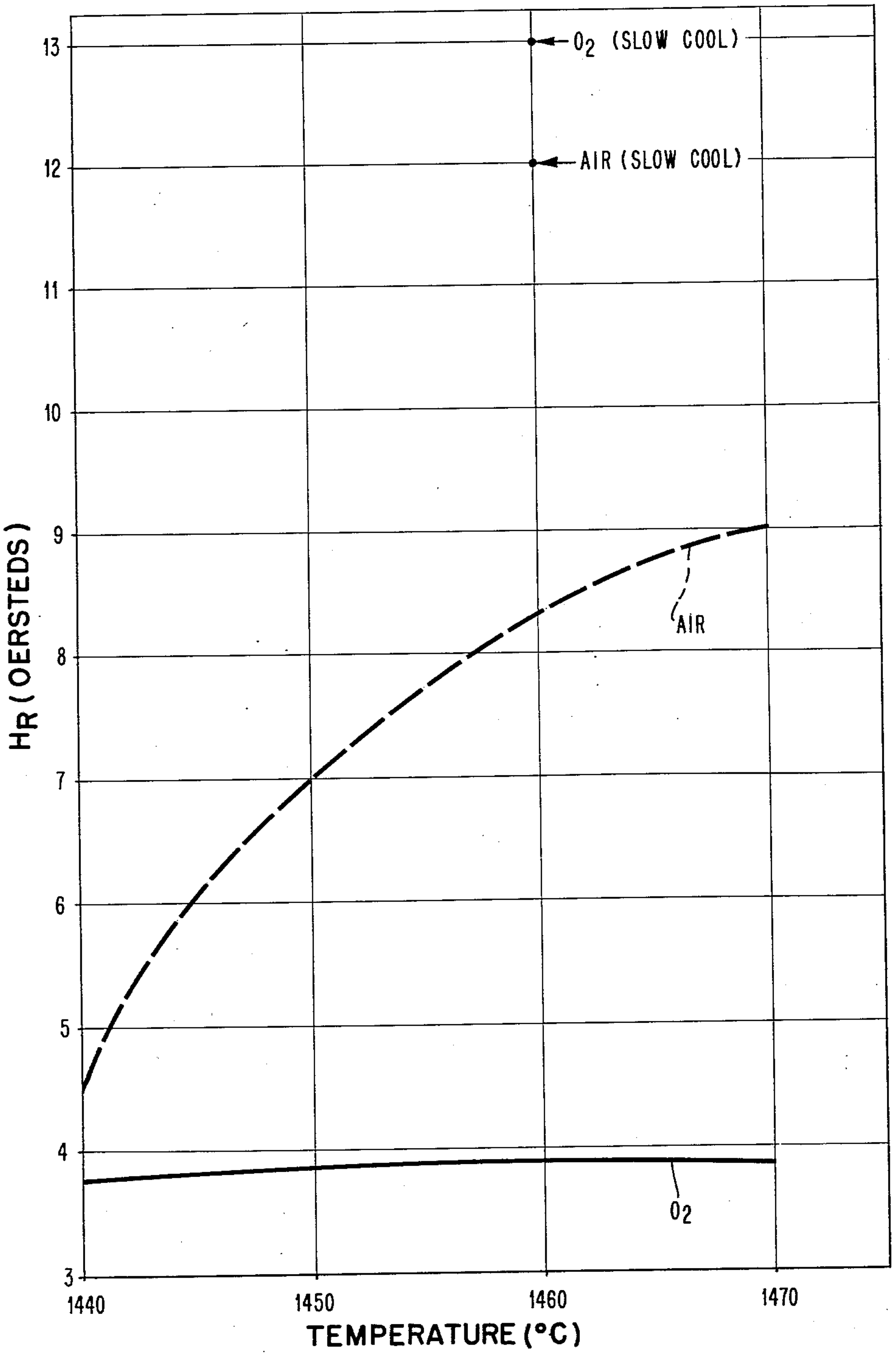
FIGURE 2 is a plot of the rotational coercive force, $H_R$, vs. sintering temperature for the same material prepared by a similar process.

FIGURE 2 shows the effect of the parameters of sintering temperature, cooling rate and firing atmosphere on the rotational coercive force, $H_R$, of the garnet. It will be noted that slow cooling produces garnets having exceedingly high $H_R$ values, about 13 oersteds, while fast quenching at lower temperatures in the range 1440–1470° C. and in $O_2$ produces products having $H_R$ values of about 4 oersteds and in air about 4.5–9 oersteds.

The method of the present invention consists essentially of sintering the garnet constituents in the range 1440–1470° C. in an oxygen oxidizing atmosphere and fast quenching the sintered product to room temperature. A low moment garnet particularly suitable for computer use is obtained by sintering the garnet powders at 1460° C. in air and fast quenching to room temperature. A low coercive force garnet is obtained by sintering at 1450° C. in $O_2$ and fast quenching.

Various substitutions for Y, Al or Fe may be made as is known in the art as long as the resultant low moment garnet possesses a $B_r/B_s$ ratio of at least 0.5, the lower limit for use of these materials as switching elements in two dimensional memory arrays or as in matrix switching devices.

While every variation in composition in the garnet series has not been described the method of the present invention may be generally applied to garnet materials to improve their magnetic characteristics as described.

While we have shown a preferable presintering or calcining treatment it is to be understood that other calcining schemes may be practiced as are known in the art.

What has been described herein is a method of preparing high speed, low coercive force, low moment garnets having a $B_r/B_s$ ratio of about 0.7, which method involves sintering the garnet powders at elevated temperatures in the range 1440–1470° C. in an oxygen oxidizing atmosphere and rapidly quenching the thus formed garnet to room temperature. Garnets thus prepared have low magnetic moments, in the order of about 200 gausses, switching constants in the order of 0.11 oersted-microsecond and an output voltage of greater than 30 millivolts. The high speed garnets thus prepared are particularly desirable in application in computer circuitry in that they do not overheat during the switching operation and do not induce a large back voltage in the drive lines.

While the invention has been particularly shown and described with reference to preferred embodiments thereof, it will be understood by those skilled in the art that various changes in form and details may be made therein without departing from the spirit and scope of the invention.

What is claimed is:

1. The method of preparing high speed, low moment yttrium-aluminum-iron garnets of the composition $$Y_3AlFe_4O_{12}$$

which comprises providing calcined powders of $Y_2O_3$, $Al_2O_3$ and $Fe_2O_3$ in proportions corresponding to said formula, sintering said powders at elevated temperatures in the range 1440–1470° C. in an oxygen oxidizing atmosphere for about 8 hours and quenching the garnet formed to room temperature.

2. The method according to claim 1 wherein said atmosphere is air.

3. The method according to claim 1 wherein said oxidizing atmosphere is $O_2$.

4. The method of preparing high speed, low moment yttrium-aluminum-iron garnets of the composition $$Y_3AlFe_4O_{12}$$

which comprises providing calcined powders of $Y_2O_3$, $Al_2O_3$ and $Fe_2O_3$ in proportions corresponding to said formula, sintering said powders at 1460° C. in an air atmosphere for 8 hours and quenching the garnet formed to room temperature during two minutes, said garnet having the following magnetic properties: $B_s=190$ gausses, $S_w=0.11$ oersted-microsecond, $B_r/B_s=0.7$ and $H_R=8.2$ oersteds.

5. The method of preparing high speed, low moment yttrium-alumium-iron garnets of the composition $$Y_3AlFe_4O_{12}$$

which comprises providing calcined powders of $Y_2O_3$, $Al_2O_3$ and $Fe_2O_3$ in proportions corresponding to said formula, sintering said powders at 1450° C. in an $O_2$ atmosphere for 8 hours and quenching the garnet formed to room temperature during two minutes, said garnet having the following magnetic properties, $B_s=190$ gausses, $S_W=0.12$, $B_r/B_s=0.7$ and $H_R=3.8$ oersteds.

6. The method of preparing high speed, low moment yttrium-alumium-iron garnets of the composition $$Y_3AlFe_4O_{12}$$

which comprises providing 1.0 gram of $Al_2O_3$ and 6.3 grams of $Fe_2O_3$, calcining said powders at 1000° C. in air for one hour, mixing the calcined powders with 6.7 grams of $Y_2O_3$, further calcining the mixture at 1300° C. in air for an additional hour, shaping said powders into core bodies of 30 mils inside diameter, 50 mils outside diameter and 12 mils thickness, sintering said bodies in a temperature range of 1440–1470° C. for 8 hours in an oxygen oxidizing atmosphere and quenching the garnet formed to room temperature during two minutes.

7. The method according to claim 6 wherein said atmosphere is air and said sintering temperature is 1460° C.

8. The method according to claim 6 wherein said atmosphere is $O_2$ and said sintering temperature is 1450° C.

References Cited in the file of this patent

Calhoun: IBM Tech. Disclosure Bull., vol. 1, No. 2, p. 26 (August 1958).

Pauthenet: Proceedings 4th Symposium Magnetism and Magnetic Materials, pp. 290S–292S, April 1959.

Calhoun: Proceedings 4th Symposium Magnetism and Magnetic Materials, pp. 293S–294S, April 1959.